(12) United States Patent
DiSabatino et al.

(10) Patent No.: US 9,649,704 B2
(45) Date of Patent: May 16, 2017

(54) DEBRIS VENT FOR A SAW BLADE HOUSING

(71) Applicant: Deere & Company, Moline, IL (US)

(72) Inventors: Benjamin DiSabatino, Brantford (CA); Michael F. James, Carlisle (CA)

(73) Assignee: Deere & Company, Moline, IL (US)

( * ) Notice: Subject to any disclaimer, the term of this patent is extended or adjusted under 35 U.S.C. 154(b) by 811 days.

(21) Appl. No.: 14/058,062

(22) Filed: Oct. 18, 2013

(65) Prior Publication Data
US 2015/0107116 A1    Apr. 23, 2015

(51) Int. Cl.
*A01G 23/091* (2006.01)
*B23D 59/00* (2006.01)

(52) U.S. Cl.
CPC ......... *B23D 59/006* (2013.01); *A01G 23/091* (2013.01)

(58) Field of Classification Search
CPC .... A01G 23/08; A01G 23/081; A01G 23/083; A01G 23/091; A01G 23/093
See application file for complete search history.

(56) References Cited

U.S. PATENT DOCUMENTS

| | | | | |
|---|---|---|---|---|
| 5,816,299 A * | 10/1998 | Mathews | ............. | A01G 23/091 144/335 |
| 6,068,035 A * | 5/2000 | DiSabatino | .......... | A01G 23/091 144/336 |
| 6,176,280 B1 | 1/2001 | DiSabatino et al. | | |
| 6,382,274 B1 * | 5/2002 | Hicks | ................... | A01G 23/091 144/336 |

* cited by examiner

*Primary Examiner* — Matthew G Katcoff
(74) *Attorney, Agent, or Firm* — Lorenz & Kopf, LLP (57) ABSTRACT

A saw assembly and saw blade housing are disclosed. The housing includes a pocket portion configured to expose a portion of the saw blade for cutting of material. The housing includes an enclosure portion configured to enclose a portion of the saw blade that is not exposed by the pocket portion. The housing includes an entrance region through which the saw teeth pass during operation of the saw blade in order to enter the enclosure portion from the pocket portion. The housing includes an exhaust vent located within the enclosure portion of the housing and downstream of the entrance region, from the perspective of the operational rotation of the saw blade. The exhaust vent is configured to redirect debris material entering the enclosure portion of the housing via the entrance region, the debris material being redirected in a forward direction from the perspective of a cutting operation utilizing the saw blade.

18 Claims, 11 Drawing Sheets

DEBRIS VENT FOR A SAW BLADE HOUSING

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to saw blade housings, and in particular to structures to discharge chips and other debris out of saw blade housings.

BACKGROUND OF THE DISCLOSURE

Rotary saw blades may be utilized in a variety of settings and applications in order to facilitate various cutting operations. For example, in forestry operations, sawing implements such as feller-bunchers may be utilized to harvest standing trees. In such implements, for example, one or more disc-shaped saw blades having peripheral teeth may be rotated around a generally vertical (or other) axis in order to fell selected tree trunks. A saw blade of such an implement (or other implements) may be partially enclosed within a saw blade housing, with a forward pocket of the housing configured to expose a portion of the toothed periphery of the disk in order to facilitate cutting of a generally horizontal kerf into selected trees. During operation, saw blades may be rotated with large angular velocities, in order to facilitate efficient cutting of the selected trees. As a result, significant kinetic energy may be transmitted to the wood chips produced by the cutting (as well as other debris). This transmitted energy may result in some of the chips being ejected away from the saw blade (e.g., from accumulation points within the saw's gullet regions—the spaces along the disk periphery between the various saw teeth) at relatively high velocities.

Chips ejected away from the saw blade (e.g., from the gullet regions) generally travel with a direction that is tangent to the local rotation of the saw blade. Particularly for chips ejected from regions of the saw blade near the downstream edge of the housing pocket (from the perspective of the direction of rotation of the saw blade), such a tangential path may be directed toward an entrance into the interior of the saw blade housing. As such, one potential issue for sawing operations is that the tangential flight path of ejected debris may result in debris (such as wood chips) entering the housing. This may act to clog the housing, as accumulating chips increase the frictional drag on the saw blade or other assembly parts, or may otherwise adversely affect the operation of the relevant saw blade and related equipment (e.g., through abrasive or impact damage to mechanisms and surfaces contained by the housing). To address this issue, certain housings may accordingly incorporate a deflector around the downstream wall of the pocket, such that some chips ejected from the saw blade may be redirected in a generally forward direction and thereby be prevented from entering the housing. Such a solution, however, may still permit other chips and debris to enter the saw blade housing. For example, chips carried within the saw gullets, particularly if resulting from a cut made near the saw blade's entry to the enclosed portion of the housing may be carried into the housing before centrifugal action may cause their ejection away from the blade. Further, it may be advantageous to keep the saw blade housing relatively narrow (e.g., to facilitate more selective cutting of particular trees within tightly packed growth areas), which may increase the proportion of chips and debris that are not caught by a pocket deflector and that, accordingly, may enter the enclosed portion of the housing. Therefore, it may be useful to provide a saw blade housing that better addresses handling of chips and debris, among other advantages.

SUMMARY OF THE DISCLOSURE

A saw blade housing is disclosed for deflecting wood chips and other debris away from the housing.

According to one aspect of the disclosure, a saw blade housing for a rotating saw blade having a plurality of teeth includes a pocket portion configured to expose a portion of the saw blade for cutting of material during operation of the saw blade. The housing includes an enclosure portion configured to enclose a portion of the saw blade that is not exposed by the pocket portion. The housing includes an entrance region through which the plurality of teeth successively pass, during operation of the saw blade, in order to enter the enclosure portion from the pocket portion. The housing includes a first exhaust vent located within the enclosure portion of the housing and downstream of the entrance region, from the perspective of the operational rotation of the saw blade. The first exhaust vent is configured to redirect debris material entering the enclosure portion of the housing via the entrance region, the debris material being redirected by the first exhaust vent in a forward direction, from the perspective of a cutting operation utilizing the saw blade.

One or more of the following features may be included in the disclosed saw blade housing. The first exhaust vent may include a window in the housing. The window may include a downstream wall, the downstream wall including a deflector portion configured to redirect the debris material, at least in part, in the forward direction. The deflector portion of the downstream wall may include a vertically uniform, curved deflector wall. A reference gullet of the saw blade may be located, at least in part, one of within the pocket portion and downstream of the pocket portion, and may be defined, at least in part, by an upstream and a downstream tooth, both teeth being included in the plurality of teeth included in the saw blade. The downstream wall may be configured to be intersected by a first reference line, the first reference line being tangent to the saw blade periphery at a point within the reference gullet. The first reference line may be determined when the reference gullet is oriented such that a second reference line, tangent to the saw blade periphery at a point on the upstream tooth of the gullet, passes through the entrance region. The first reference line may be determined when the reference gullet is oriented such that a portion of the upstream tooth is one of at or downstream of a third reference line, the third reference line extending radially from a center of rotation of the saw blade to a portion of the entrance region.

During operation of the saw blade, the pocket portion may define, at least in part, a primary throw zone forward of the housing for debris material ejected by portions of the saw blade that are within the pocket. The downstream wall of the window of the first exhaust vent may define, at least in part, a secondary throw zone for the debris material that is redirected by the first exhaust vent, the secondary throw zone having an outer edge, with respect to the saw blade housing. The outer edge of the secondary throw zone may intersect the primary throw zone a finite distance from the housing. The housing may include a second exhaust vent including another window in the housing, the second exhaust vent being located within the enclosure portion of the housing and downstream of the first exhaust vent.

According to another aspect of the disclosure, a saw assembly includes a saw blade housing for a rotating saw blade having a plurality of teeth. The saw assembly includes a pocket portion of the housing configured to expose a portion of the saw blade for cutting of material during operation of the saw blade. The saw assembly includes an enclosure portion of the housing configured to enclose a portion of the saw blade that is not exposed by the pocket portion. The housing includes an entrance region through which the plurality of teeth successively pass, during operation of the saw blade, in order to enter the enclosure portion from the pocket portion. The housing includes a first exhaust vent located within the enclosure portion of the housing and downstream of the entrance region, from the perspective of the operational rotation of the saw blade. The first exhaust vent is configured to redirect debris material entering the enclosure portion of the housing via the entrance region, the debris material being redirected by the first exhaust vent in a forward direction, from the perspective of a cutting operation utilizing the saw blade.

One or more of the following features may be included in the disclosed saw assembly. The first exhaust vent may include a window in the housing. The window may include a downstream wall, the downstream wall including a deflector portion configured to redirect the debris material, at least in part, in the forward direction. The deflector portion of the downstream wall may include a vertically uniform, curved deflector wall. A reference gullet of the saw blade may be located, at least in part, one of within the pocket portion and downstream of the pocket portion, and may be defined, at least in part, by an upstream and a downstream tooth, both teeth being included in the plurality of teeth included in the saw blade. The downstream wall may be configured to be intersected by a first reference line, the first reference line being tangent to the saw blade periphery at a point within the reference gullet. The first reference line may be determined when the reference gullet is oriented such that a second reference line, tangent to the saw blade periphery at a point on the upstream tooth of the gullet, passes through the entrance region. The first reference line may be determined when the reference gullet is oriented such that a portion of the upstream tooth is one of at or downstream of a third reference line, the third reference line extending radially from a center of rotation of the saw blade to a portion of the entrance region.

During operation of the saw blade, the pocket portion may define, at least in part, a primary throw zone forward of the housing for debris material ejected by portions of the saw blade that are within the pocket. The downstream wall of the window of the first exhaust vent may define, at least in part, a secondary throw zone for the debris material that is redirected by the first exhaust vent, the secondary throw zone having an outer edge, with respect to the saw blade housing. The outer edge of the secondary throw zone may intersect the primary throw zone a finite distance from the housing. The housing may include a second exhaust vent including another window in the housing, the second exhaust vent being located within the enclosure portion of the housing and downstream of the first exhaust vent.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed saw assembly and saw blade housing, as shown in the accompanying figures of the drawings described briefly above.

As also noted above, the rapid rotation of rotary saw blades, and the configuration of such saw blades to have extended teeth and recessed gullets around the circumference of a saw blade disk, may contribute to the carrying of debris (e.g., saw dust, wood chips, stones, and so on) into the enclosed portion of a housing of the saw blade. This may result in undesirable wear or other damage to the saw blade, the housing, or a variety of other components in a larger saw assembly. Further, this detrimental phenomena may be exacerbated by other factors inherent to productive in-field use of relevant saw assemblies. For example, in certain operations it may be desirable to cut targeted trees with a portion of the saw that is as close as possible to the point where the saw blade enters the enclosed portion of the housing. In such a case, accordingly, portions of the saw blade involved in a cut may enter the enclosed portion of the housing before sufficient time has passed for centrifugal action to eject debris from the saw blade gullets, which may result in significant debris being carried into the housing. Notably, efforts to address this issue (e.g., through the addition of external deflector plates) often result in the widening of the saw blade housing, which, in particular, may not be optimal for selective cutting operations. For example, a significantly widened saw blade housing may prevent operation of the saw assembly in close quarters (e.g., to cut a tree in close proximity to a boulder of other obstacle), or may result in unwanted damage (e.g., scarring) to non-targeted (i.e., non-cut) trees during a thinning operation.

In light of these and other issues, therefore, various embodiments of the saw blade housing disclosed herein may beneficially facilitate the ejection of debris from within the housing, thereby avoiding potential damage/wear to the housing from the debris. Further, the various configurations discussed herein may beneficially result in the ejection of debris from the housing in a direction that is generally oriented away from an operator of the saw, even during tilted cuts (during which, for example, the axis of a relevant saw assembly may be tilted forward in order to make a cut).

Figure 1:
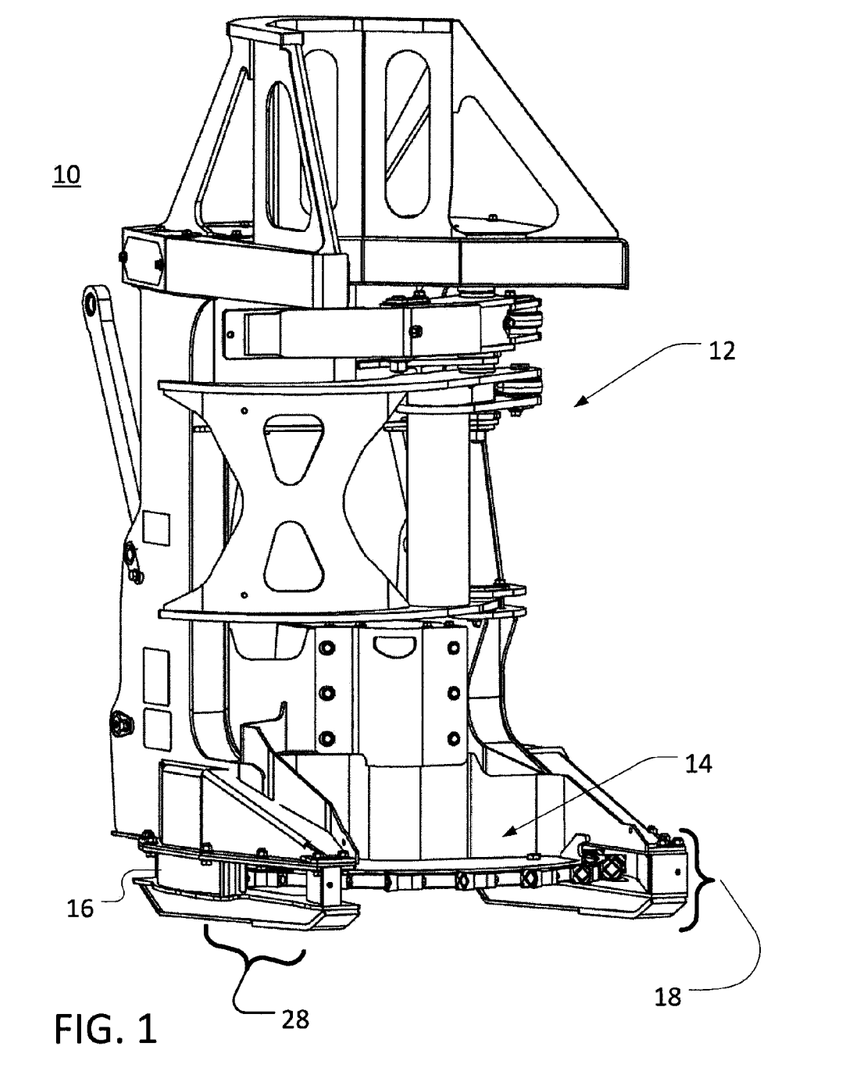
FIG. 1 is a perspective view of an example saw assembly, in which the disclosed saw blade housing may be implemented.
Figure 2:
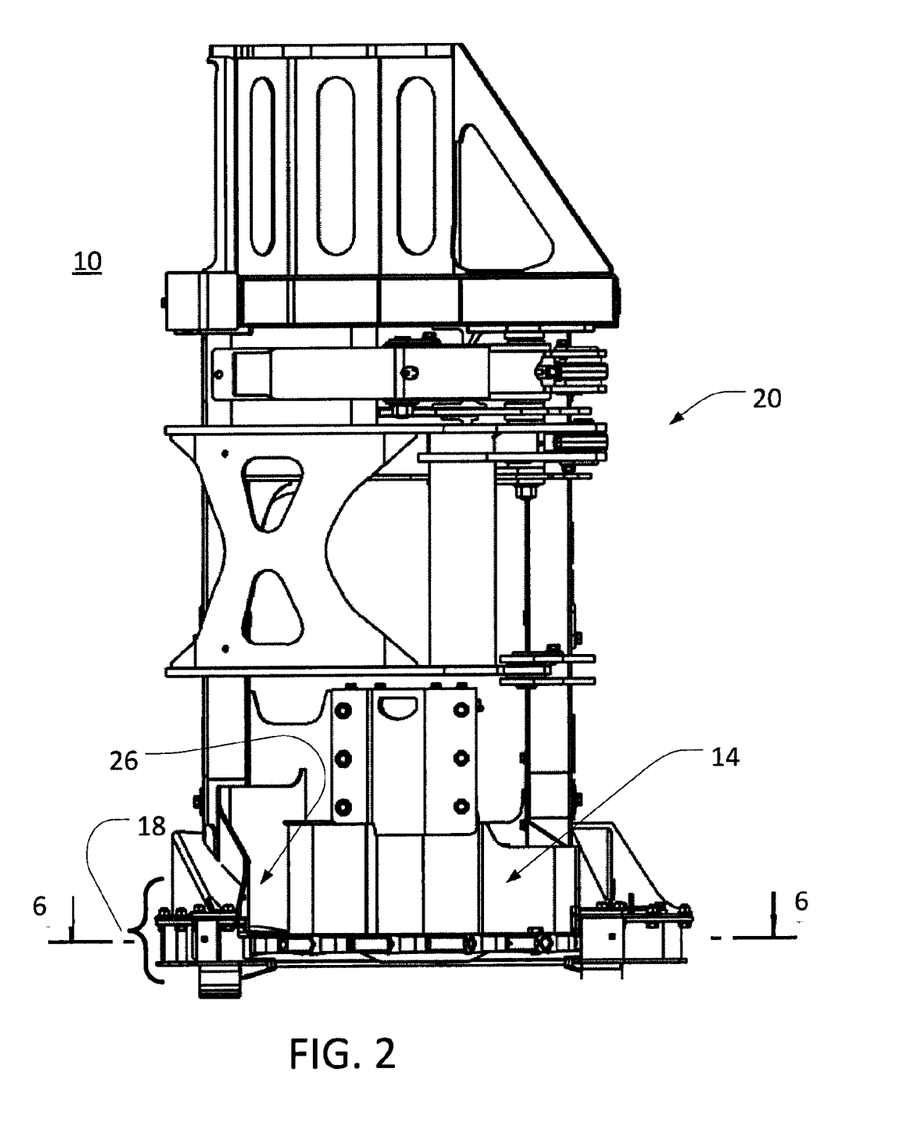
FIG. 2 is a perspective view of a pocket portion of the saw assembly of FIG. 1.

Accordingly, referring now to FIGS. 1 through 4, example saw assembly 10 is depicted. Such an assembly may be employed, for example, as part of a feller-buncher (not shown) or other wood-handling equipment and may include, on body portion 12, various arms or other mechanisms for grasping or otherwise addressing trees or other in-field objects. In various circumstances, cutting operations may be executed using saw assembly 10. To facilitate this, in certain embodiments, assembly 10 may include pocket 14 and enclosure portion 16, both forming part of housing 18. Enclosure portion 16 may, as depicted, enclose a portion of saw blade 20, as well as other mechanisms or components. In contrast, pocket 14 may expose a portion of saw blade 20, including various teeth 22 and gullets 24 (i.e., the space between two saw blade teeth), in order to facilitate various cutting operations. As saw assembly 10 is depicted in FIGS. 1 and 2 (as well as FIGS. 6-10), for example, saw blade 20 may generally spin to the left in order to cut material. As such, during operation, the various saw teeth 22 and gullets 24 may pass successively across pocket 14, through entrance region 26 (e.g., a gap in a side wall of pocket 14) and into enclosure portion 16 of housing 18. As also discussed above, for example, this rotation of saw blade 20 may carry (e.g., via the various gullets 24) various types of debris out of pocket 14, through entrance region 26, and into enclosure portion 16 of housing 18.

Figure 3:
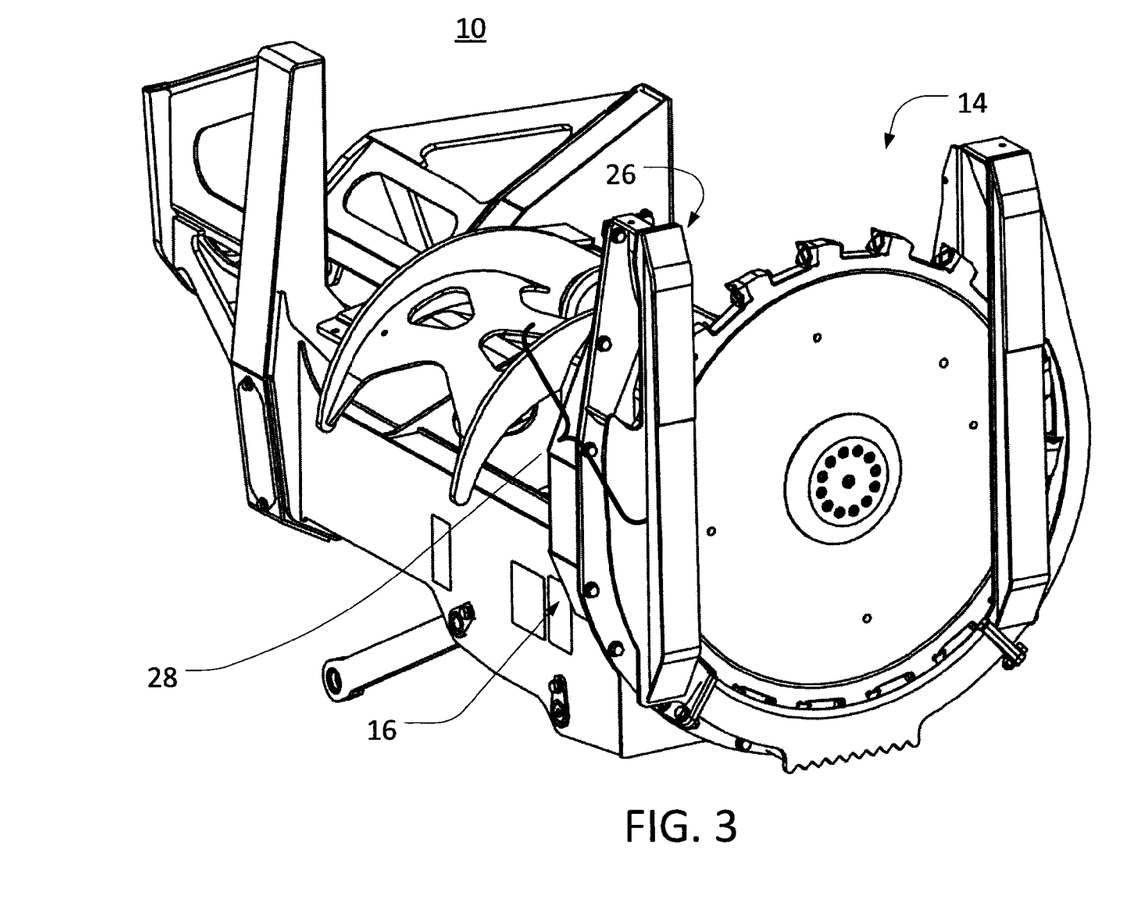
FIG. 3 is another perspective view of the saw assembly of FIG. 1.
Figure 4:
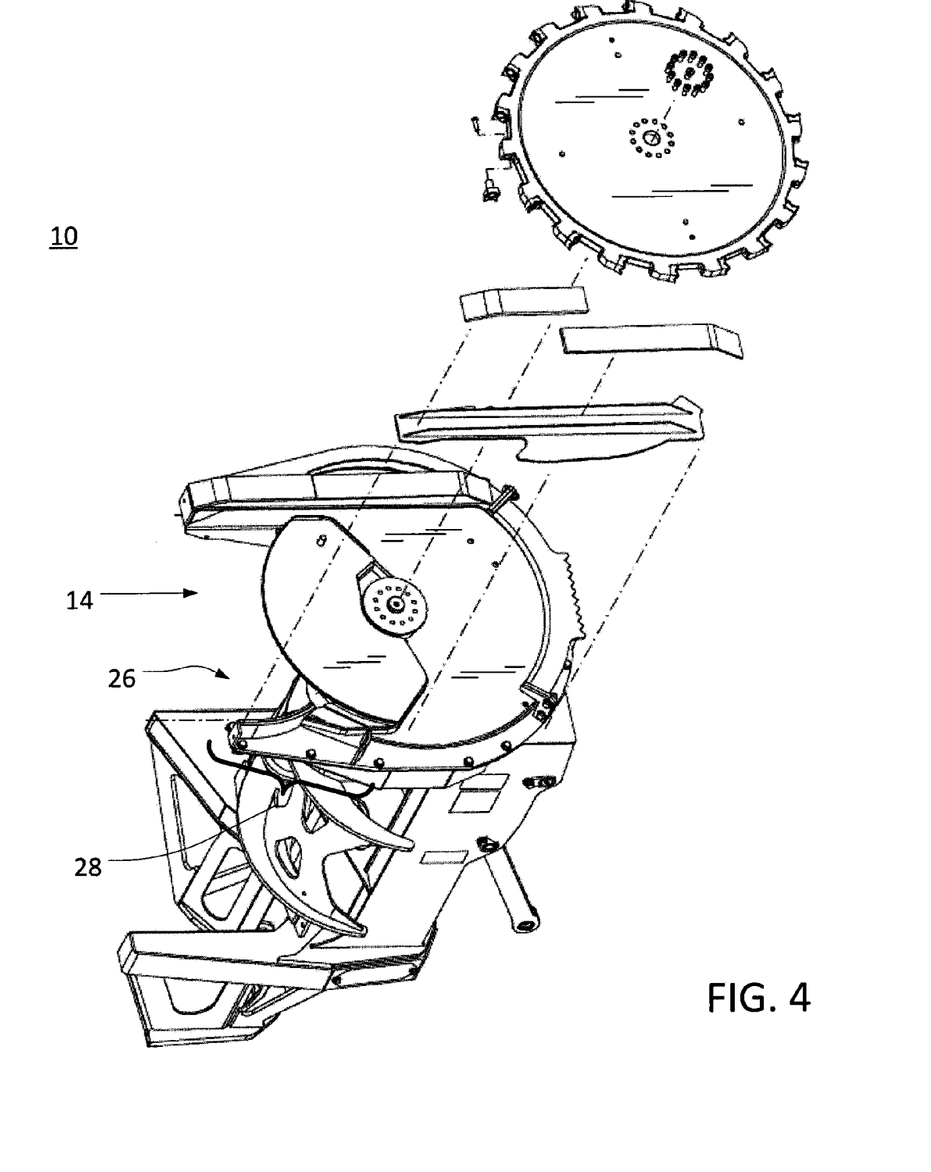
FIG. 4 is an exploded perspective view of the saw assembly of FIG. 1.
Figure 5:
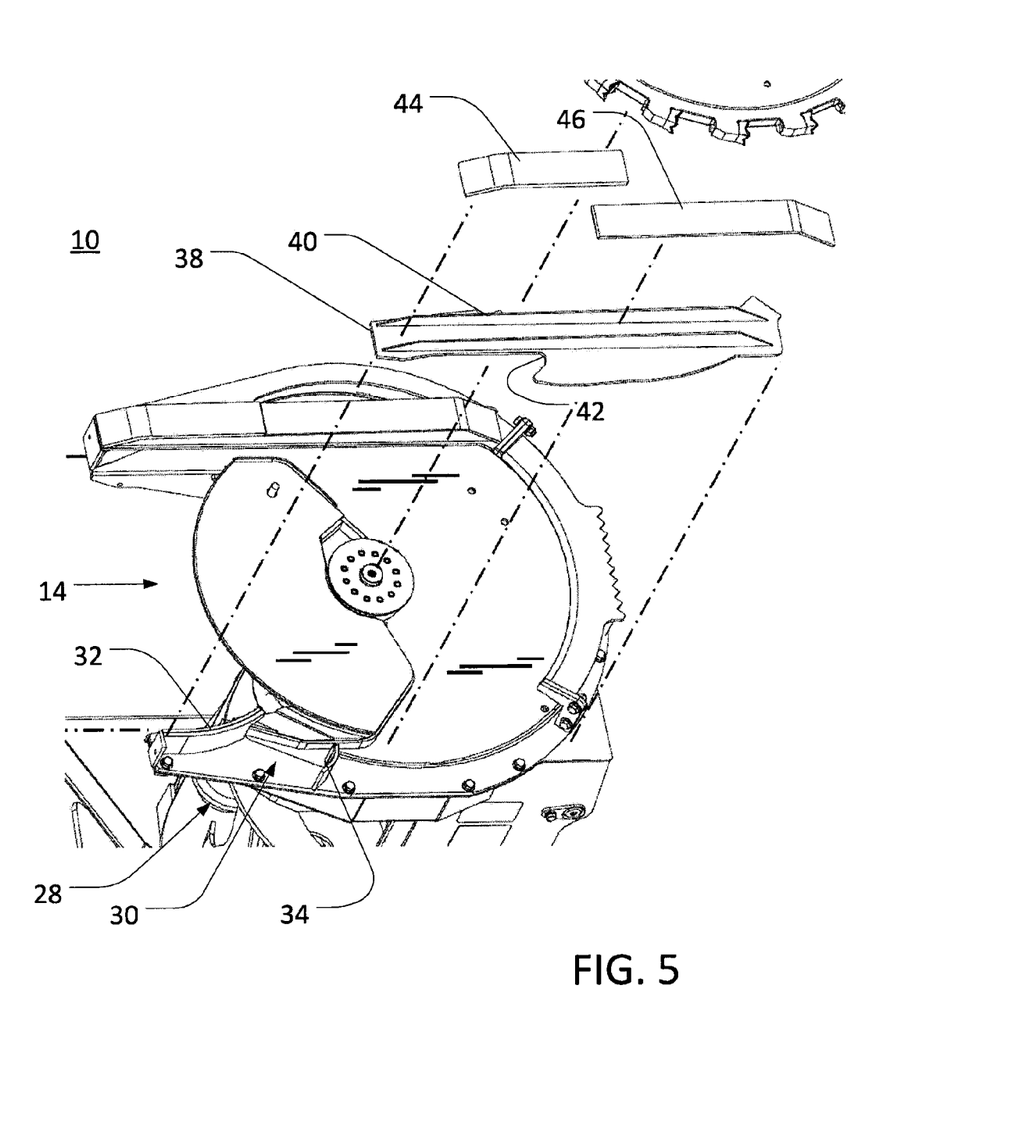
FIG. 5 is an enlarged view of a portion of the exploded perspective view of the saw assembly of FIG. 1.

Accordingly, and referring now in particular to FIGS. 3 and 4, exhaust vent 28 may beneficially be provided in enclosure portion 16 of housing 18. Exhaust vent 28 may be configured in a variety of ways, using a variety of known manufacturing techniques. For example, referring now also to FIGS. 5 and 6, in certain embodiments, exhaust vent 28 may include window 30, which may provide a flow (or flight) path for debris, from portions of the saw blade (not pictured in FIG. 5) that are within enclosure portion 16 to the surrounding environment. Exhaust vent 28 may be further defined, for example, by upstream wall 32 and downstream wall 34, which may collectively provide a channel for the passage of debris, through window 30 and out of enclosure portion 16. In certain configurations, one side of upstream wall 32 (i.e., wall 32a) may define a primary forward exhaust wall and the other side of upstream wall 32 (i.e., wall 32b) may define an upstream wall of exhaust vent 28. (As used herein, "upstream" and "downstream" will be used with respect to the rotational direction of saw blade 20 during a single reference revolution. For example, as saw blade 20 rotates during a cutting operation, a given tooth 22 moves progressively "downstream" from its starting point.) In certain embodiments, downstream wall 34 may include a deflector portion 36. For example, downstream wall 34 may include a curved deflector portion 36, which may be configured as a curved (or partially curved) wall of uniform height (e.g., as measured perpendicular to the plane of saw blade 20) and, in certain embodiments, uniform thickness. In this way, for example, debris striking downstream wall 34 may be deflected (e.g., carried, via the curve of curved deflector portion 36) through exhaust vent 28 and thereby out of and away from enclosure portion 16. Further (as discussed in greater detail below), in certain configurations of deflector portion 36 of downstream wall 34 (e.g., certain curved or angled configurations), the deflection of debris by downstream wall 34 may be generally forward, from the perspective of the normal operation of saw assembly 10. (As used herein, "forward" will be understood to indicate a direction that is generally oriented away from the rear portion of assembly 10 and towards the front portion of assembly 10.)

Figure 6:
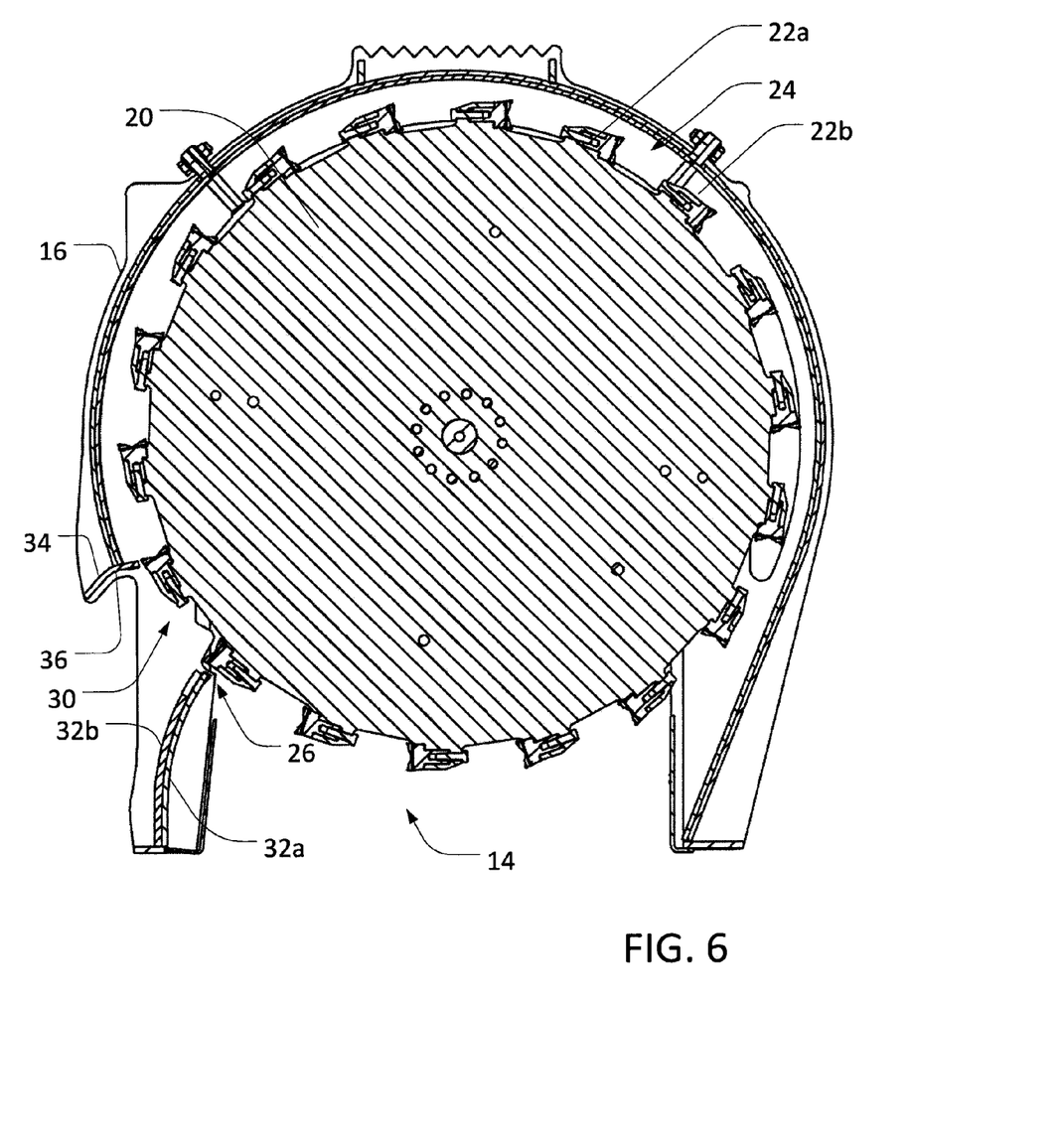
FIG. 6 is a sectional view of the saw assembly of FIG. 1, taken at plane 6-6 of FIG. 2.

As depicted in FIG. 6, it may be beneficial to configure downstream wall 34 (including, for example, deflector portion 36) so that appropriate clearance is obtained between downstream wall 34 and the passing teeth of saw blade 20. It will be understood that this clearance may be configured with a variety of dimensions, the selection of which may be influenced by various considerations. For example, smaller clearance dimensions may generally correspond to interception of more debris by downstream wall 34 (or, generally, exhaust vent 28), whereas larger clearance dimensions may require less exact tolerances during manufacturing (and operation) of the saw assembly in order to ensure safe passage of saw teeth 22 past downstream wall 34 and through enclosure portion 16 of housing 18.

In various embodiments, exhaust vent 28 may be integrated with housing 18 in various ways. For example, window 30 may be cut (or otherwise machined) in an internal wall of enclosure portion 16, and upstream wall 32 or downstream wall 34 may be attached to housing 18 (or another component of assembly 10) in various known ways. As noted above, in certain embodiments upstream wall 32 of exhaust vent 28 may also form part of a downstream wall of pocket 14. Additionally or alternatively, upstream wall 32 may be formed separately from any pocket wall (not shown) and attached to housing 18 (or another component of assembly 10) in various known ways. Further, it will be understood that embodiments of the exhaust vent disclosed herein may be included in a variety of saw heads, including saw heads without removable saw housings.

In certain embodiments, other components of (or associated with) housing 18 may further contribute to the beneficial functionality of exhaust vent 28. For example, referring now in particular to FIG. 5, containment plate 38 may provide a floor to exhaust vent 28 and thereby prevent, to varying degrees, the downward exhaust of debris via exhaust vent 28. In certain embodiments, containment plate 38 may include, for example, one or more reinforcing ribs 40, various contours (e.g., notch 42), and other cosmetic or functional elements (e.g., bottom face plates 44 and 46).

Figure 7:
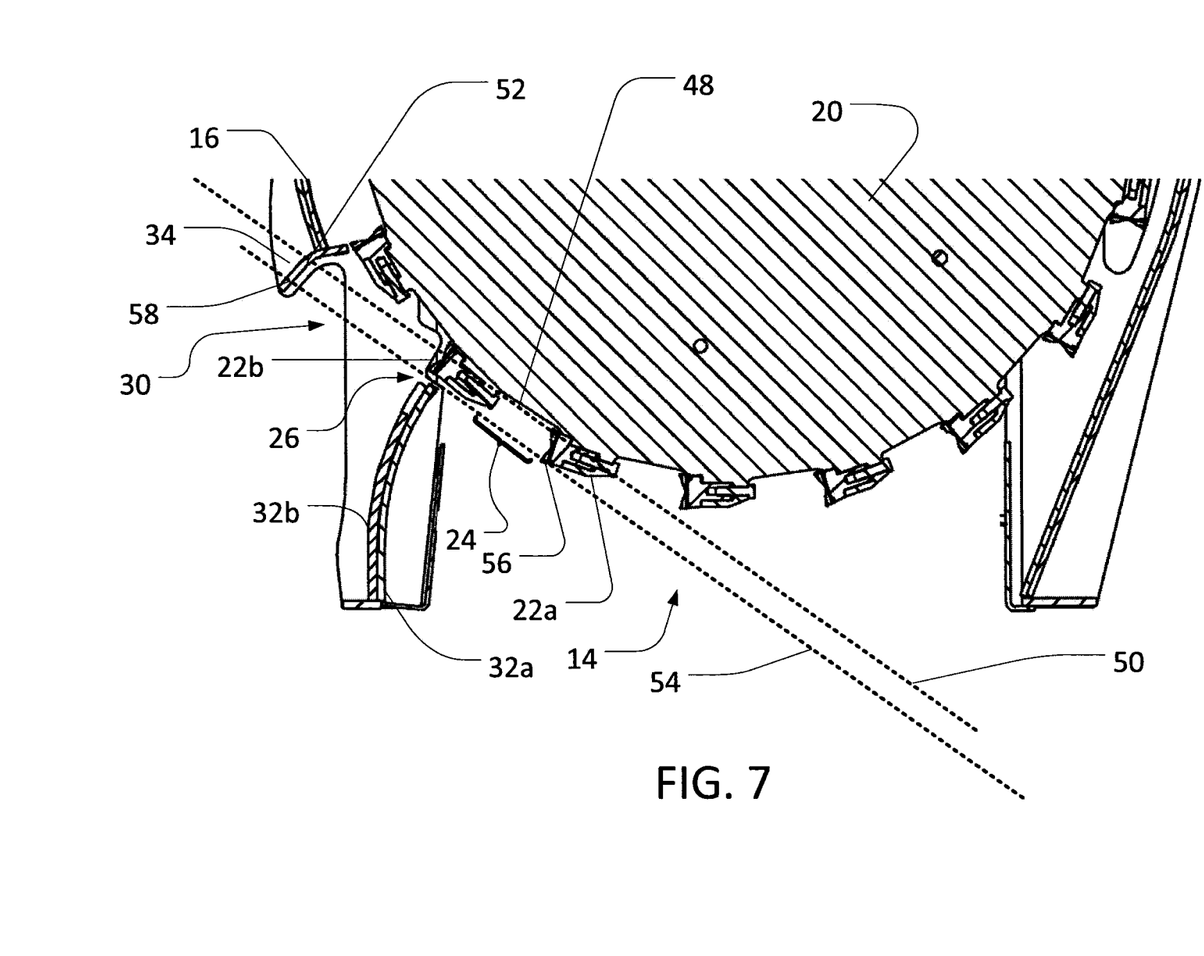
FIG. 7 is an enlarged view of a portion of the sectional view of FIG. 6, with certain geometrical relationships depicted.

Referring now also to FIG. 7, the geometry of exhaust vent 28 in certain embodiments, will be further discussed. As noted above, saw blade 20 may be configured to include a number of teeth 22 oriented around the periphery of saw blade 20, and each pair of teeth 22 may define a particular instance of gullets 24. From the perspective of cutting rotation of saw blade 20, therefore, a given gullet 24 may be defined by both upstream tooth 22a and downstream tooth 22b. Under principles of physics, debris that is ejected (e.g., through centrifugal action) from a tooth 22 or gullet 24 may tend to fly in a direction that is generally parallel to a line that is tangent to the point on (or near) saw blade 20 (e.g., the point on tooth 22 or within gullet 24) from which the debris is ejected (i.e., in a direction that is tangent to such a point with respect to a reference circumference that passes through the point and is concentric with saw blade 20). As such, for example, debris ejected from ejection point 48 within gullet 24 may tend to travel approximately along reference line 50, which is generally tangent to saw blade 20 at ejection point 48. Accordingly, it may be beneficial to configure downstream wall 34 so that it appropriately intercepts reference line 50 (i.e., at intersection point 52) and other similar reference lines. In this way, for example, downstream wall 34 may generally act to deflect debris ejected from point 48 (and other similar points) out of exhaust vent 28 and away from housing 18.

Still referring to FIG. 7, in certain embodiments, in order to effectively locate or orient downstream wall 34, it may be useful to refer to a second reference line 54, tangent to a point on upstream tooth 22a of gullet 24. As depicted in FIG. 7, for example, reference line 54 intersects tooth 22a at intersection point 56, which is located at the outer-most point of tooth 22a. Accordingly, for an orientation of saw blade 20 at which reference line 54 just clears the internal edge of upstream wall 32, orientation of downstream wall 34 to intercept reference line 50 may usefully deflect a significant fraction of the debris that enters enclosure portion 16.

Figure 8:
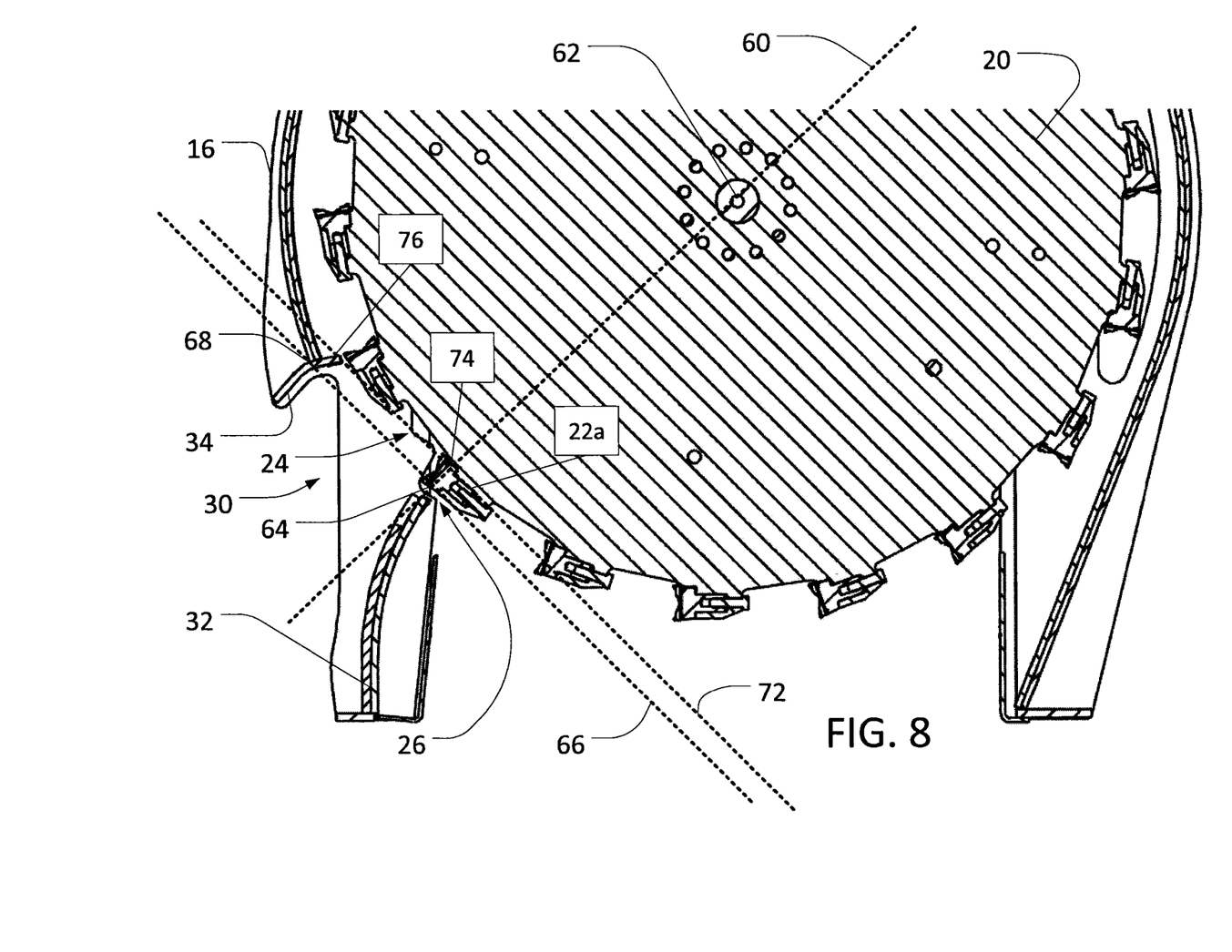
FIG. 8 is another enlarged view of a portion of the sectional view of FIG. 6, with certain additional geometric relationships depicted.

Referring now also to FIG. 8, it will be understood, according to the geometry of the depicted system, that it may be useful, in certain embodiments, to orient downstream wall 34 with respect to debris ejected from a tooth that is just entering (or just about to enter) enclosure portion 16 (i.e., tooth 22a that has completely finished its current cutting operation). As such, in certain embodiments, it may be beneficial to consider radial reference line 60, passing through center of rotation 62 of saw blade 20. As can be seen in FIG. 8, an intersection point of reference line 60 with the tooth 22a may indicate a point at which tooth 22a is passing through entrance region 26 (and, accordingly, the point at which tooth 22a may be ending its current cutting operation). In certain embodiments, such an intersection point may usefully serve as tangent point 64 for reference line 66, permitting reference line 66 to be used in order to appropriately orient downstream wall to deflect debris originating from tooth 22a (i.e., via configuration of downstream wall 34 to include intersection point 68).

In particular, still referring to FIG. 8, additional reference line 72 may intersect radial reference line 60 at tangent point 74, which may represent a point on saw blade 20 that coincides with the innermost radius of gullet 24 as gullet 24 passes through entrance region 26. As such, reference line 72 may represent a theoretical innermost path of debris ejected from saw blade 20 as it passes through entrance region 26. Accordingly, in certain embodiments, it may be beneficial to orient downstream wall 34 such that it extends into enclosure portion 16 at least so far as to intercept debris traveling along reference line 72. Therefore, for example, downstream wall 34 may be configured to include intersection point 76.

Figure 9:
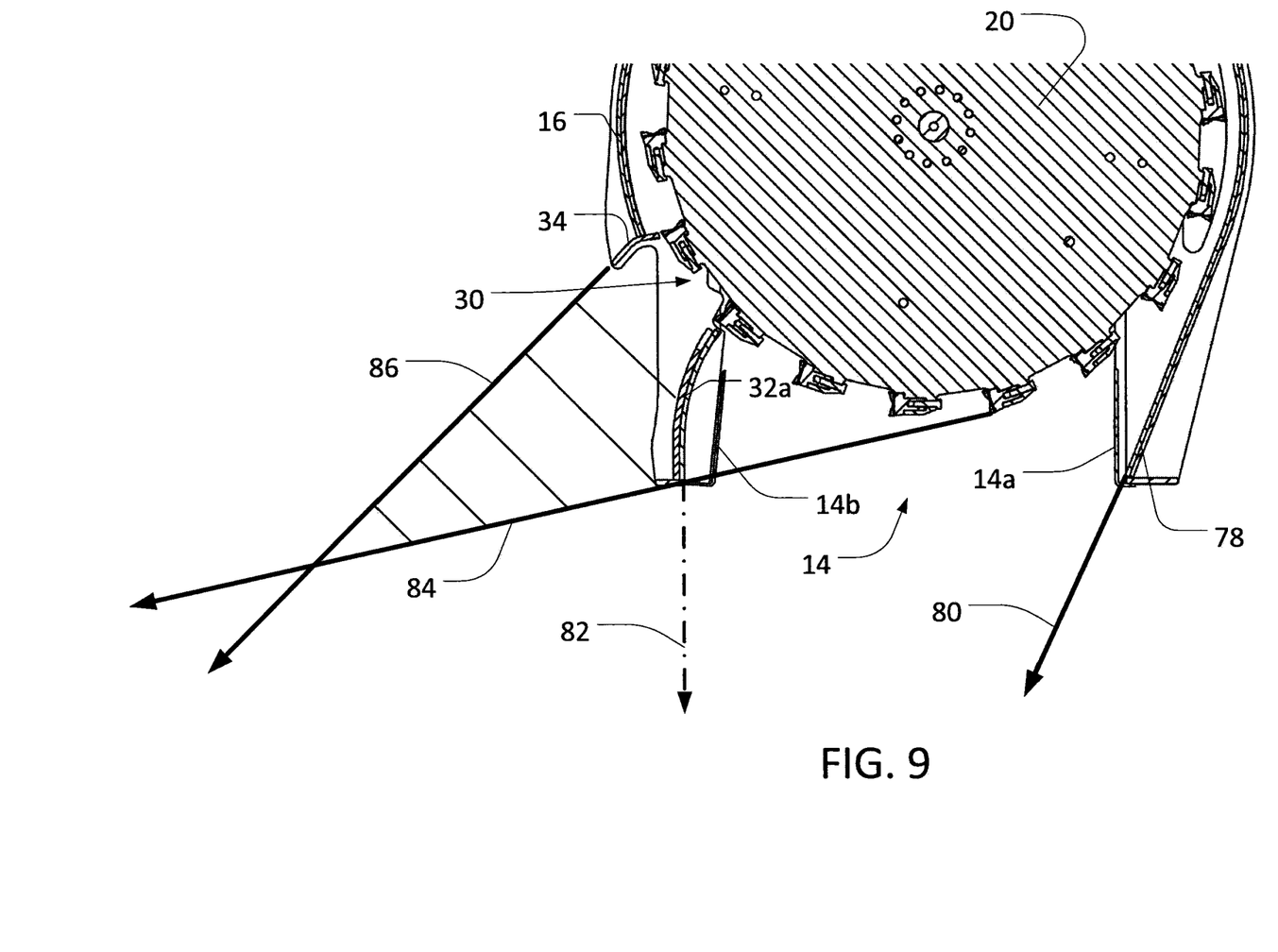
FIG. 9 is another enlarged view of a portion of the sectional view of FIG. 6, with certain additional geometric relationships depicted.

Referring now also to FIG. 9, certain aspects of the geometry of the areas into which debris is directed by saw assembly 10 (including, for example, various embodiments of exhaust vent 28) are depicted. Generally, these areas may be considered as a "throw zones" for debris. During a cutting operation, some debris may be ejected from pocket 14 (i.e., may be ejected away from assembly 10 before entering enclosure portion 16). As such, debris containment wall 78 and primary forward exhaust wall 32a may collectively define a primary throw zone for debris, forward of the housing. It will be understood that walls 78 and 32a may be distinct, respectively, from downstream pocket wall 14b and upstream pocket wall 14a, which may collectively define an opening into which a tree may enter pocket 14 and the cutting zone of the saw assembly.

Debris deflected by debris containment wall 78 may, for example, generally travel along upstream primary ejection path 80, whereas debris deflected by primary forward exhaust wall 32a may, for example, generally travel along primary forward exhaust ejection path 82. In certain embodiments, accordingly, upstream pocket wall ejection path 80 may represent the right-hand limit (from the perspective of FIG. 9) of the debris throw zone. Further, debris ejected from saw blade 20 that does not intersect either of walls 32a or 78, may travel, at its widest (downstream) path, along primary side ejection path 84, which may represent the widest reaching tangent line from an outer point of saw blade 20 through the end point of primary forward exhaust wall 32a. As such, the primary throw zone for saw assembly 10 may be considered to generally include the area between upstream primary ejection path 80 and primary side ejection path 84. (It will be understood that alternative configurations of the pocket and pocket walls may be possible, which may result in various other geometries for the primary throw zone.)

The configuration of downstream wall 34 (and other aspects of exhaust vent 28) may similarly define a throw zone, into which debris is ejected and deflected by exhaust vent 28. For example, curvature (or other aspects) of downstream wall 34 may define vent ejection path 86, which may represent the outer edge (with respect to enclosure portion 16) of the area into which debris is ejected and deflected by exhaust vent 28. For example, in certain configurations, the widest point of travel for debris ejected and deflected by exhaust vent 28 may coincide with a reference line that is tangent to the outermost point of downstream wall 34 (e.g., vent ejection path 86, as depicted in FIG. 9). As such, for example, the hatched area between vent ejection path 86 and primary side ejection path 84 may represent the additional throw area (i.e., area into which debris is directed) that may be introduced by the inclusion of exhaust vent 28 in housing 18.

In certain embodiments, it may be useful to configure downstream wall 34 (or other aspects of exhaust vent 28) in order to ensure that the additional throw area introduced by exhaust vent 28 does not result in the total throw area of saw assembly 10 (i.e., the total area into which debris may be ejected from saw assembly 10) extending wider than it would without the inclusion of exhaust vent 28 in housing 18. As such, for example, it may be useful to configure downstream wall 34 (or other aspects of exhaust vent 28) such that vent ejection path 86 intersects primary side ejection path 84 a finite distance from saw assembly 10. In this way, for example, debris may be ejected out of enclosure portion 16 by exhaust vent 28 without enlarging the width of the zone into which debris may travel. As such, for example, through the beneficial addition of side venting of debris via exhaust vent 28, the total throw area of saw assembly 10 may be increased by the area of the hatched region between vent ejection path 86 and primary side ejection path 84, while the effective throw angle of saw assembly 10 (and, accordingly, the maximum width of the zone into which debris may be directed) may continue to be defined by primary side ejection path 84.

As another consideration, in certain embodiments, saw assembly 10 may be configured to be tilted forward or backward in order to execute a cut that deviates from horizontal. As such, in certain embodiments, it may be useful to configure exhaust vent 28 (and, in particular, downstream wall 34 including deflector portion 36) to ensure that exhaust of debris from enclosure portion 16 is generally in a forward direction. For example, if downstream wall 34 is configured as a vertical wall member (e.g., with respect to the primary axis of saw assembly 10, as depicted, for example, in FIG. 5), little or no vertical deflection (again, with respect to the primary axis of saw assembly 10) may be imparted by downstream wall 34 to debris passing through exhaust vent 28. Therefore, debris may be generally ejected from exhaust vent 28 in a direction that is generally perpendicular to the primary axis of saw assembly 10 (with some deviation due to random interactions between debris and housing 18 as well as the effects of gravity). Therefore, even when saw assembly 10 is tilted away from vertical (e.g., to execute a non-horizontal cut), the debris ejected from exhaust vent 28 may still be generally directed in a forward direction. In certain embodiments, appropriate upper and lower deflector members (e.g., containment plate 38) may further enhance this effect. For example, as saw assembly 10 is tilted forward, containment plate 38 may act as a deflector redirecting certain of the ejected debris in a more generally forward direction.

Figure 10:
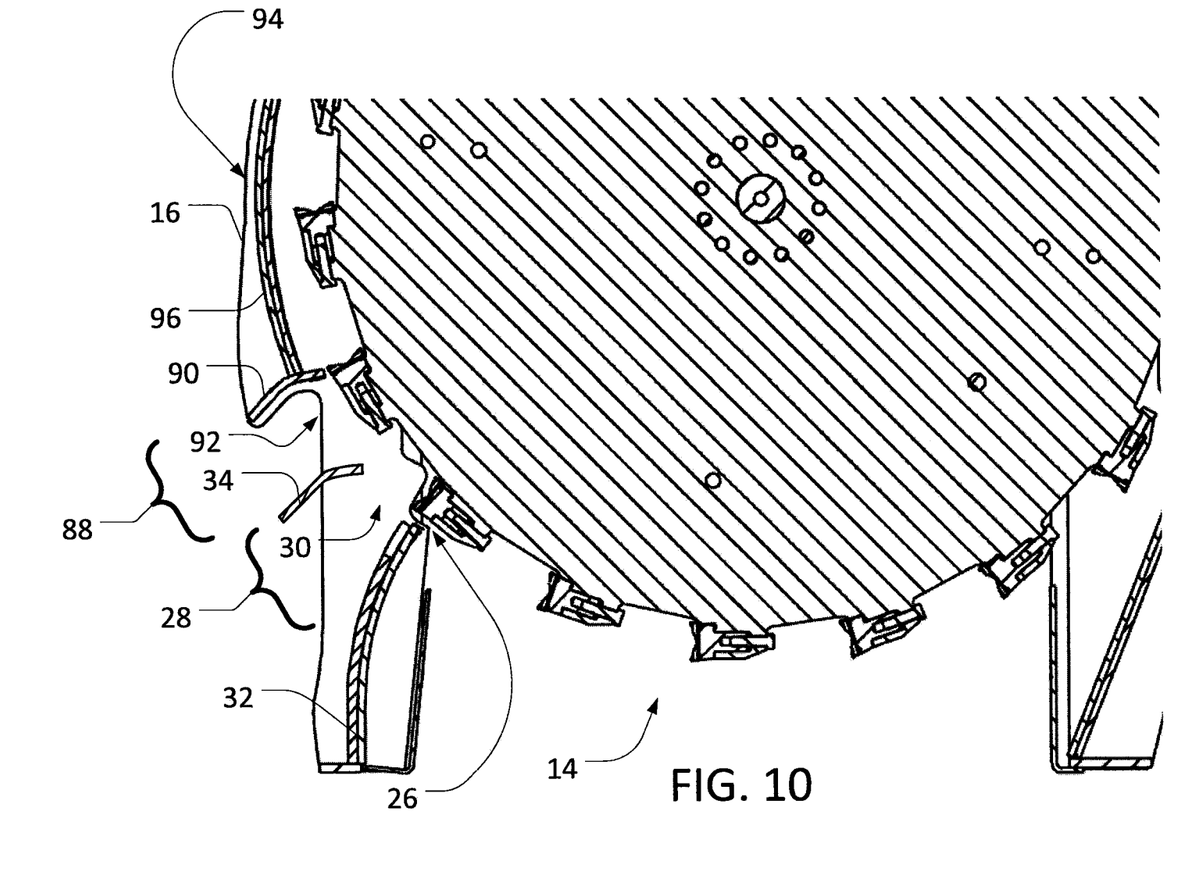
FIG. 10 is an enlarged sectional view similar to FIG. 8 showing a portion of another example saw assembly.

Referring now also to FIG. 10, in certain embodiments, multiple exhaust vents (e.g., exhaust vent 28 and second exhaust vent 88) may be included in enclosure portion 16 of housing 18. For example, in addition to downstream wall 34, which defines (in part) window 30, a secondary downstream wall 90 may be included in enclosure portion 16, with secondary downstream wall 90 further defining secondary window 92. In this way, for example, additional debris may be redirected (i.e., by either of downstream walls 34 and 90) out of enclosure portion 16 and away from saw assembly 10. It will be understood, for example, that although downstream wall 34 of exhaust vent 28 is depicted as also defining an upstream wall of window 92 (and, thereby, of secondary exhaust vent 88) other configurations are possible. For example, window 30 may be located as depicted in FIG. 8, while secondary window 92 may be located at a point further downstream. For example, secondary window 92 may be located at location 94, with section 96 of the wall of enclosure portion 16 being interposed between window 30 and secondary window 92. In certain embodiments, such a configuration, for example, may allow secondary window 92 to be relatively small with respect to the size of window 30 (or may allow both windows 92, 30 to be smaller than either would be if included alone), thereby allowing the width of housing 18 to be kept appropriately small (e.g., to preserve the width of housing 18 with respect to a configuration that includes no exhaust vents 28, 88). It will be understood that the various geometric considerations discussed herein (e.g., with respect to reference lines 54, 60, 66, 72, and so on) may be implicated, in certain embodiments, with respect to the configuration or placement of second exhaust vent 88, in addition or as an alternative to the configuration or placement of exhaust vent 28.

Figure 11:
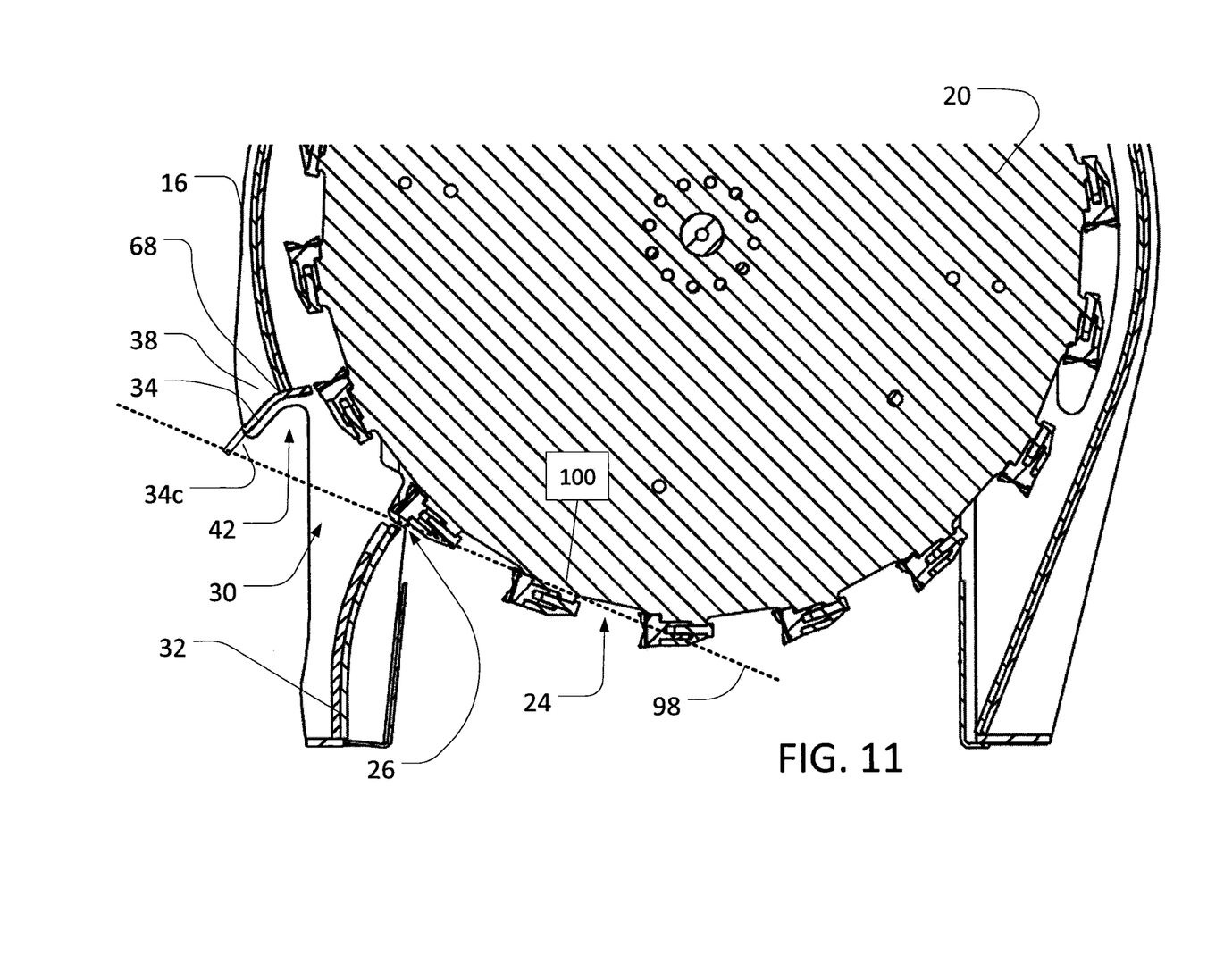
FIG. 11 is another enlarged view of a portion of the sectional view of FIG. 6, with certain additional geometric relationships depicted.

Referring now also to FIG. 11, it will be understood that in certain embodiments downstream wall 34 may be configured, at least in part, with respect to other potential paths for debris entering enclosure portion 16. For example, reference line 98 may be viewed as passing through entrance region 26 from tangent point 100 along the inner circumference of one of the various gullets 24 on saw blade 20. At a particular orientation (e.g., as saw blade 20 rotates during a cutting operation), tangent point 100 may be located such that reference line 98 passes from gullet 24 through entrance region 26 just inside of upstream wall 32. In light of the tendency of debris to be ejected tangentially to saw blade 20, this orientation of reference line 98 may then represent the widest likely path for debris entering enclosure portion 16 via entrance region 26. Accordingly, it may be useful to configure downstream wall 34 with extension 34c that intercepts reference line 98 at this orientation of line 98. Extension 34c may be configured as a separate extension of downstream wall 34 or may be an integral part of downstream wall 34. In certain embodiments, containment plate 38 and notch 42 may also be altered correspondingly (e.g., containment plate 38 may be extended from notch 42 along the entire length of extension 34c) (not shown in FIG. 11).

It will be understood, therefore, that the disclosed exhaust vent configurations (and those alternative configurations which will be apparent based on the discussion herein) may beneficially allow venting of debris from within enclosure portion 16 of housing 18 without necessarily requiring a substantial (or even any) increase in the width of housing 18. Further, it will be understood that certain of the example configurations disclosed (and various alternative configurations) may beneficially result in a throw zone for debris that is not only not wider than the throw zone of earlier designs but also remains oriented in a generally forward direction even when saw assembly 10 is tilted for off-horizontal cutting operations. It will also be understood, due to the beneficial configuration of the disclosed exhaust vents, that these features may be implemented either through retrofit of existing saw assemblies or by manufacture of entirely new saw assemblies.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A saw blade housing for a rotating saw blade having a plurality of teeth, the housing comprising:
a pocket portion configured to expose a portion of the saw blade in a forward direction for cutting of material during operation of the saw blade;
an enclosure portion configured to enclose a portion of the saw blade that is not exposed by the pocket portion;
an entrance region through which the plurality of teeth successively pass, during operation of the saw blade in order to enter the enclosure portion from the pocket portion; and a first exhaust vent located within the enclosure portion of the housing and downstream of the entrance region from the perspective of the operational rotation of the saw blade;

wherein the first exhaust vent is configured to redirect debris material entering the enclosure portion of the housing via the entrance region, the debris material being redirected by the first exhaust vent in the forward direction.

2. The saw blade housing of claim 1, wherein the first exhaust vent includes a window in the housing.

3. The saw blade housing of claim 2, wherein the window includes a downstream wall, the downstream wall including a deflector portion configured to redirect the debris material, at least in part, in the forward direction.

4. The saw blade housing of claim 3, wherein the deflector portion of the downstream wall includes a vertically uniform, curved deflector wall.

5. The saw blade housing of claim 3, wherein a reference gullet of the saw blade is located, at least in part, one of within the pocket portion and downstream of the pocket portion, and is defined, at least in part, by an upstream and a downstream tooth, both teeth being included in the plurality of teeth included in the saw blade; and wherein the downstream wall is configured to be intersected by a first reference line, the first reference line being tangent to the saw blade periphery at a point within the reference gullet.

6. The saw blade housing of claim 5, wherein the first reference line is determined when the reference gullet is oriented such that a second reference line, tangent to the saw blade periphery at a point on the upstream tooth of the gullet, passes through the entrance region.

7. The saw blade housing of claim 6, wherein the first reference line is determined when the reference gullet is oriented such that a portion of the upstream tooth is one of at or downstream of a third reference line, the third reference line extending radially from a center of rotation of the saw blade to a portion of the entrance region.

8. The saw blade housing of claim 3, wherein, during operation of the saw blade, the pocket portion defines, at least in part, a primary throw region ahead of the housing in the forward direction for debris material ejected by portions of the saw blade that are within the pocket;

wherein the downstream wall of the window of the first exhaust vent defines, at least in part, a secondary throw region for the debris material that is redirected by the first exhaust vent, the secondary throw region having an outer edge, with respect to the saw blade housing; and wherein the outer edge of the secondary throw region intersects the primary throw region a finite distance from the housing.

9. The saw blade housing of claim 3, further comprising: a second exhaust vent including another window in the housing, the second exhaust vent being located within the enclosure portion of the housing and downstream of the first exhaust vent.

10. A saw assembly, comprising:
a saw blade housing for a rotating saw blade having a plurality of teeth;
a pocket portion of the housing configured to expose a portion of the saw blade in a forward direction for cutting of material during operation of the saw blade;
an enclosure portion of the housing configured to enclose a portion of the saw blade that is not exposed by the pocket portion;
an entrance region of the housing through which the plurality of teeth successively pass, during operation of the saw blade in order to enter the enclosure portion from the pocket portion; and
a first exhaust vent, located within the enclosure portion and downstream of the entrance region from the perspective of the operational rotation of the saw blade;
wherein the first exhaust vent is configured to redirect debris material entering the enclosure portion via the entrance region, the debris material being redirected by the first exhaust vent in the forward direction.

11. The saw assembly of claim 10, wherein the first exhaust vent includes a window in the housing.

12. The saw assembly of claim 11, wherein the window includes a downstream wall, the downstream wall including a deflector portion configured to redirect the debris material, at least in part, in the forward direction.

13. The saw assembly of claim 12, wherein the deflector portion of the downstream wall includes a vertically uniform, curved deflector wall.

14. The saw assembly of claim 12, wherein a reference gullet of the saw blade is located, at least in part, one of within the pocket portion and downstream of the pocket portion, and is defined, at least in part, by an upstream and a downstream tooth, both teeth being included in the plurality of teeth included in the saw blade; and wherein the downstream wall is configured to be intersected by a first reference line, the first reference line being tangent to the saw blade periphery at a point within the reference gullet.

15. The saw assembly of claim 14, wherein the first reference line is determined when the reference gullet is oriented such that a second reference line, tangent to the saw blade periphery at a point on the upstream tooth of the gullet, passes through the entrance region.

16. The saw assembly of claim 15, wherein the first reference line is determined when the reference gullet is oriented such that a portion of the upstream tooth is one of at or downstream of a third reference line, the third reference line extending radially from a center of rotation of the saw blade to a portion of the entrance region.

17. The saw assembly of claim 12, wherein, during operation of the saw blade, the pocket portion defines, at least in part, a primary throw region ahead of the housing in the forward direction for debris material ejected by portions of the saw blade that are within the pocket;

wherein the downstream wall of the window of the first exhaust vent defines, at least in part, a secondary throw region for the debris material that is redirected by the first exhaust vent, the secondary throw region having an outer edge, with respect to the saw blade housing; and wherein the outer edge of the secondary throw region intersects the primary throw region a finite distance from the housing.

18. The saw assembly of claim 12, further comprising: a second exhaust vent including another window in the housing, the second exhaust vent being located within the enclosure portion of the housing and downstream of the first exhaust vent.

* * * * *